United States Patent [19]

Peterson

[11] Patent Number: 4,667,282
[45] Date of Patent: May 19, 1987

[54] MULTIPHASE RECTIFIER CIRCUIT WITH DYNAMIC AC INPUT TO DC OUTPUT VOLTAGE RANGE COMPRESSION UTILIZING HALF AND FULL WAVE RECTIFICATION MODES

[75] Inventor: William A. Peterson, Vestal, N.Y.

[73] Assignee: General Electric Company, Binghamton, N.Y.

[21] Appl. No.: 809,804

[22] Filed: Dec. 16, 1985

[51] Int. Cl.[4] ............................................. H02M 7/217
[52] U.S. Cl. ...................................... 363/89; 363/126; 363/127
[58] Field of Search ...................... 363/80, 81, 89, 126, 363/127, 143; 323/266, 300

[56] References Cited

U.S. PATENT DOCUMENTS 2,777,107  1/1957  Medlar ................................. 363/126
3,205,426  9/1965  Mills ..................................... 363/88
3,720,868  3/1973  Lee ....................................... 363/89

FOREIGN PATENT DOCUMENTS 80166   5/1984  Japan .................................... 363/87
81619   5/1985  Japan .................................... 363/87
489183  1/1976  U.S.S.R. ............................... 363/126

OTHER PUBLICATIONS

Brown, "Switching Scheme Matches Supply to Mains," EDN, vol. 26, No. 2, p. 153, Jan. 21, 1981.

Primary Examiner—William H. Beha, Jr.
Attorney, Agent, or Firm—I. David Blumenfeld

[57] ABSTRACT

A rectifier circuit connected with a variable voltage AC source for providing a range of DC output voltages narrower than the range of AC voltage input by controllably switching between half-wave and full wave rectification.

8 Claims, 5 Drawing Figures

MULTIPHASE RECTIFIER CIRCUIT WITH DYNAMIC AC INPUT TO DC OUTPUT VOLTAGE RANGE COMPRESSION UTILIZING HALF AND FULL WAVE RECTIFICATION MODES

The present invention relates in general to apparatus for rectifying the output of an AC source and more specifically to a rectifier circuit controllably operating to limit the output voltage range of a variable voltage AC source.

BACKGROUND OF THE INVENTION

Rectifier circuits are well known in the art and are frequently used within a power supply circuit which generates a regulated DC output for use by electronic circuit components. The rectifier circuit is typically coupled between the AC source, from which the power supply circuit derives unregulated power, and the voltage regulator portion of the supply. The function of the voltage regulator portion is, among other things, to provide a substantially constant output voltage irrespective of variations in the AC source. The rectifier circuit, however, normally provides a rectified output that follows variations in the AC source to which it is coupled. Thus, the voltage regulator must be capable of performing its function for an anticipated wide range of rectifier output voltages. However, regulators are normally rated for operation with an input voltage that varies over only a limited range. For example, a typical input voltage range for a regulator may be 10 to 50 volts, i.e. a voltage variation of one to five. Thus, if the AC source voltage, and hence the rectifier output voltage, is expected to vary over a range greater than that for which the regulator to be used is rated, application of a single such regulator may not be suitable. One known solution to this problem is to apply multiple regulators to the rectifier output either in cascaded or parallel connection. The multiple regulators represent additional expense, take up additional space and have an adverse effect on overall power supply reliability.

One example of a variable voltage AC source which has an exceptionally wide output voltage range is a 3-phase permanent magnet alternator. Such an alternator includes a mechanically driven shaft carrying a plurality of permanent magnets. One use of such alternators is in aircraft where they are driven by the aircraft engine. Since the alternator generates an AC voltage whose magnitude is in direct proportion to the rotational speed of the mechanical driver, in aircraft applications, no-load voltages can vary over a range exceeding twenty to one.

The electrical output of such alternators in aircraft applications is typically coupled to a switched mode type of power supply, a supply type well known in the art. One characteristic of a switched mode power supply is that it draws substantially constant power from the source to which it is coupled irrespective of the source voltage. As a result, when the alternator output voltage is low, a proportionately higher current will be drawn by the power supply in order to maintain a constant power input. However, due to the large series inductive reactance often found in such alternators, the alternator output voltage will be further depressed by the higher current. Thus, the overall output voltage range of such an alternator when coupled to this type of power supply can exceed the no-load voltage range.

One solution to the problem of accommodating a large alternator output voltage range known in the art is to provide the alternator armature with winding taps. The taps are utilized to shunt portions of the winding as a function of output voltage in order to reduce the overall output voltage range. This solution requires the fabrication of a special alternator with winding taps, as well as control circuitry and a tap changing mechanism for effecting the appropriate shunt connections between taps.

When the alternator output voltage range exceeds the rating of the regulator to be applied thereto, and multiple regulators, as previously described, are applied to a high impedance alternator capable of producing a wide output voltage range, an additional problem results. That is, the components of the regulators must be capable of withstanding both the high currents experienced during low voltage conditions and the additional voltage stresses imposed during high voltage conditions.

OBJECTS OF THE INVENTION

It is an object of the present invention to provide a rectifier circuit which is automatically operable to compress the range of voltages developed by a variable AC voltage source.

Another object of the present invention is to provide a rectifier circuit which obviates the need for multiple voltage regulators in the power supply as in the past.

An additional object of the present invention is to provide a rectifier circuit which eliminates the need for tap changing mechanisms on alternator armatures.

A further object of the present invention is to provide a rectifier circuit which enables use of a voltage regulator, the components of which may be rated for limited ranges of voltage and current.

SUMMARY OF THE INVENTION

These and other objects are accomplished by the present invention which is directed to a rectifier circuit for accepting a wide range of voltages from a variable voltage AC source and delivering a relatively narrow range of rectified output voltages. The rectifier circuit comprises first and second parallel-connected rectifiers for rectifying voltages of opposite polarity. The first rectifier is coupled directly to one polarity output terminal of the rectifier circuit, while the second rectifier is coupled to the rectifier circuit opposite polarity output terminal through switching means. The rectifier circuit further includes a control circuit operable to open and close the switching means to switch between half-wave or full wave rectification of the source voltage. The control circuit opens and closes the switching means as a predetermined function of the rectifier circuit output voltage magnitude to limit the circuit output voltages to a range considerably narrower than the range over which the source voltage may vary.

These and other objects of the invention, together with the features and advantages thereof will become apparent from the following detailed description when read together with the accompanying drawings in which applicable reference designations have been carried forward.

DESCRIPTION OF THE INVENTION

Figure 1:
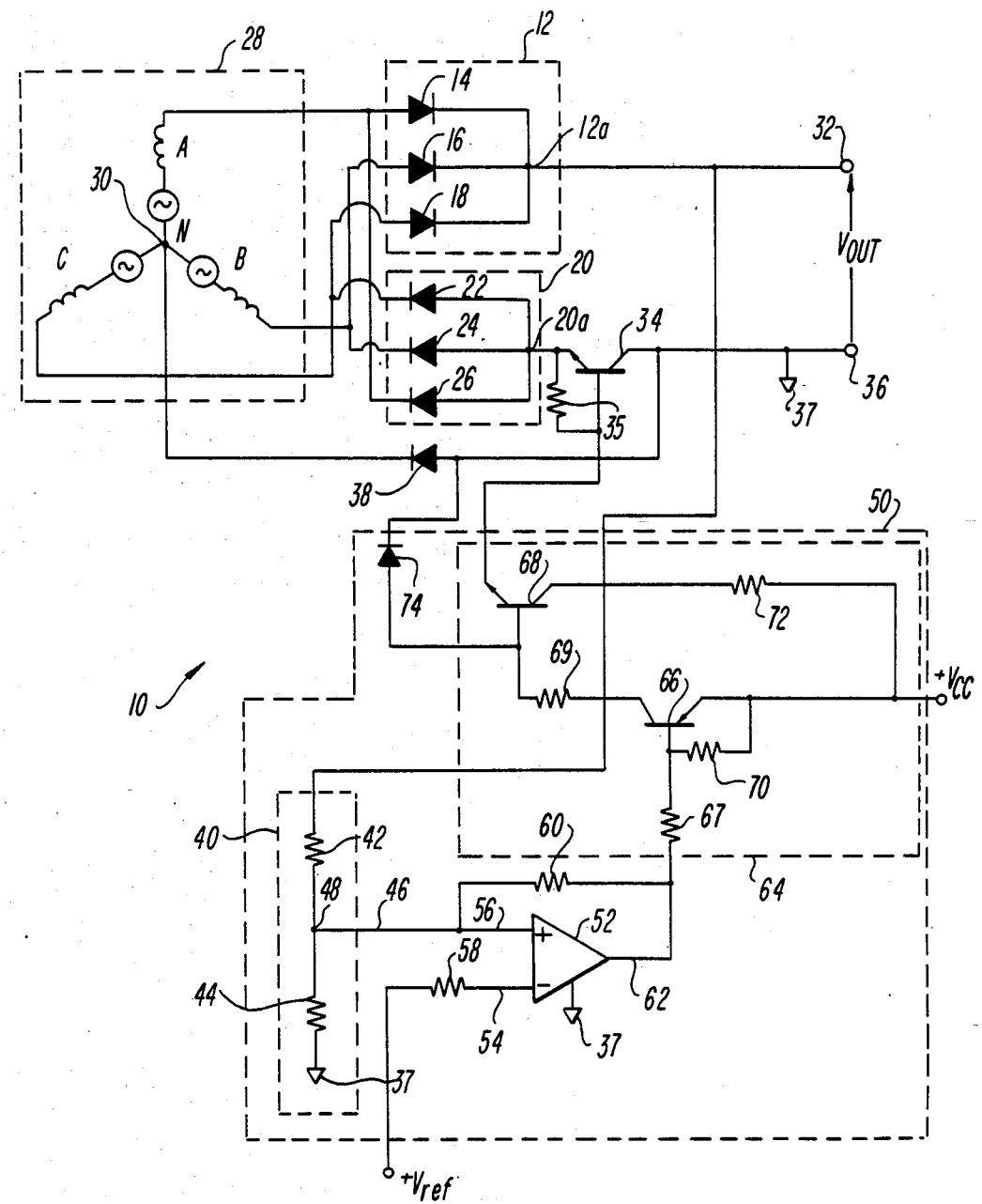
FIG. 1 is a circuit schematic diagram of a preferred embodiment of a rectifier circuit constructed in accordance with the present invention.

Referring to FIG. 1, a rectifier circuit, generally indicated at 10, includes a first half-wave rectifier network 12 and a second half-wave rectifier network 20. The inputs of rectifier networks 12 and 20 are connected to a three-phase voltage source 28. For illustrative purposes, the three phases of the source have been respectively designated A, B and C. Source 28 is wye-connected and includes a neutral point 30, designated N and accessible for electrical connection. In the illustrated embodiment of the present invention, rectifier network 12 comprises three diodes 14, 16 and 18, the cathodes of which are connected electrically in common at a junction 12a, while rectifier network 20 comprises three diodes 22, 24 and 26 whose anodes are connected to a common junction 20a. Each diode in each rectifier circuit is connected to a different phase of the voltage source. As will be seen, rectifier networks 12 and 20 are oppositely poled so as to rectify voltages of opposite polarities. Thus, rectifier 12 is configured to conduct upon application thereto of a positive polarity source voltage while rectifier 20 conducts when a negative polarity source voltage is applied to it.

The output junction 12a of rectifier network 12 is directly connected to a first output terminal 32 of circuit 10. The output junction 20a of rectifier network 20 is connectable through a switch to a second output terminal 36 of the circuit. In the illustrated embodiment of the present invention, this switch comprises an NPN bipolar transistor switch 34. A resistor 35 is connected between the base and emitter terminals of transistor switch 34 to serve as a leakage path for junction current when the transistor is nonconducting. A diode 38 is coupled between terminal 36 and source neutral point 30. Additionally, terminal 36 is connected to a common voltage reference point 37 for circuit 10.

Circuit 10 further comprises a control circuit 50 which, in the illustrated embodiment, includes voltage scaling means for supplying a signal voltage proportional to that appearing on terminal 32. In the preferred embodiment of the present invention such scaling means is provided as a voltage divider 40 consisting of a pair of resistors 42 and 44 connected in series between terminal 32 and common voltage reference point 37. An output 46 of the divider is connected to a node 48 which joins resistors 42 and 44. Control circuit 50 further includes a voltage comparator 52 of which a first input 54 is coupled to an external reference voltage source, designated $V_{ref}$ in FIG. 1, through a resistor 58. A second input 56 of the comparator is coupled to output 46 of divider 40.

A resistor 60 is coupled between comparator output 62 and input 56. Output 62 is also coupled to means 64 for conditioning transistor switch 34 to close and open. In the illustrated embodiment of the present invention, means 64 comprises a typical transistor driver circuit for operating transistor switch 34. This driver circuit includes a PNP bipolar transistor 66 the base of which is coupled to comparator output 62 through a resistor 67. The emitter of transistor 66 is coupled to an external positive voltage source designated $+V_{cc}$. The collector of transistor 66 is coupled to the base of an NPN bipolar transistor 68 through a resistor 69. A resistor 70 is coupled between the base and emitter terminals of transistor 66 to serve as a leakage path for junction current when the transistor is nonconducting. The collector of transistor 68 is coupled to external voltage source $+V_{cc}$ through a resistor 72. The emitter of transistor 68 is coupled to the base of transistor switch 34. A diode 74 is coupled between the base of transistor 68 and output 36 of circuit 10.

In operation, rectifier circuit 10 operates as a 3-phase full wave rectifier with transistor switch 34 closed and as a 3-phase half-wave rectifier with the switch open. Since, in general and for a given source AC voltage level, the output voltage of a half-wave rectifier is significantly less than that of a full wave rectifier, circuit 10 is operated with transistor switch 34 in an open circuit condition above a first predetermined value of rectifier circuit output voltage. Below a second predetermined circuit output voltage value, less than the first, circuit 10 is operated with the switch in a closed circuit condition. This achieves the desired result of limiting the rectified output voltage range as compared to the source voltage range.

Figure 2:
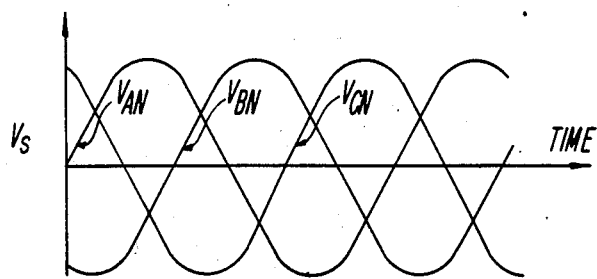
FIG. 2 is a graphical representation of an exemplary 3-phase AC voltage waveform.
Figure 3:
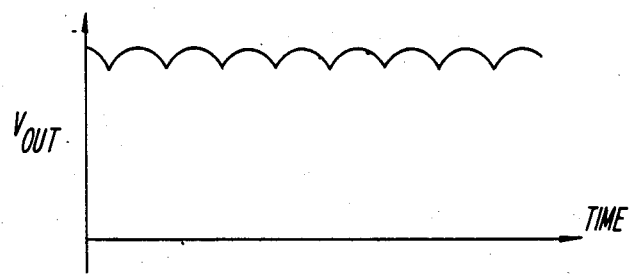
FIG. 3 is a graphical representation of an exemplary 3b 3-phase full wave rectified voltage waveform.

FIG. 2 illustrates a balanced 3-phase AC output voltage waveform generated by source 28 and applied to rectifier networks 12 and 20. The phase-to-neutral voltages are respectively designated $V_{AN}$, $V_{BN}$ and $V_{CN}$. The rms value of the phase-to-neutral voltages is designated Vs. With transistor switch 34 closed, i.e. the transistor in a conducting mode, full wave rectification results. Further, diode 38 is nonconducting due to the reverse biasing voltage across it. During this mode, the voltage on terminal 32 with respect to terminal 36, designated $V_{out}$ in FIG. 1, has a waveform as illustrated in FIG. 3. This waveform is simply that of the output of a 3-phase full wave rectifier and, as is well known in the art, has a peak value equal to $\sqrt{3} \times \sqrt{2} \times V_s$ or approximately $2.45 \times V_s$, where $V_s$ is the source rms phase-to-neutral voltage. The average value of the $V_{out}$ waveform is equal to $\sqrt{3} \times \sqrt{2} \times (3/90) \times V_s$ or approximately $2.33 \times V_s$.

Figure 4:
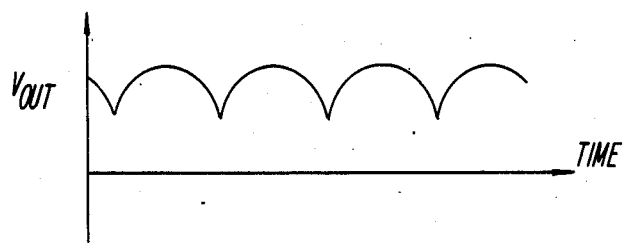
FIG. 4 is a graphical representation of an exemplary 3-phase half-wave rectified positive voltage waveform.

With transistor switch 34 open, i.e. the transistor in a nonconducting mode, half-wave rectification results and $V_{out}$ has a waveform as illustrated in FIG. 4. During half-wave rectification, rectifier circuit 20 is nonconducting and diode 38 is conducting due to the forward biasing voltage applied to it, thus providing a return path to source 28. The latter waveform is simply that of a 3-phase positive half-wave rectifier and, as is well known in the art, has a peak value of $\sqrt{2} \times V_s$ or approximately $1.41 \times V_s$. The average value of the $V_{out}$ waveform during half-wave rectification is equal to $3 \times \sqrt{3} \times V_s / (\sqrt{2} \times \pi)$ or approximately $1.17 \times V_s$. Thus, half-wave rectification reduces the peak value of $V_{out}$ achieved during full wave rectification by a factor of 2.33/1.17 or 1.73 and the average value of $V_{out}$ by a factor of 2.45/1.41 or 1.99.

Control circuit 50 operates to open and close transistor switch 34 respectively at first and second predetermined values of $V_{out}$. Such values are selected in accordance with the expected output voltage range of source 28 as well as the voltage range capability of the voltage regulator circuit to be used in the power supply. The reference voltage $V_{ref}$ is selected in accordance with these predetermined values of $V_{out}$.

A signal voltage appearing at node 48 of divider 40 is proportional to $V_{out}$ since resistors 42 and 44 are coupled between terminal 32 and rectifier circuit common voltage reference point 37. This signal voltage is applied to input 56 of comparator 52 by way of divider output 46. When the voltage at input 56 is less than that applied at input 54, i.e. $V_{ref}$, the output of the comparator is in a low state. In the low state, output 62 is connected by the circuitry of the comparator to circuit common voltage reference point 37. As a result, the base of transistor 66 is also connected to the circuit common reference. Due to the application of $+V_{cc}$ to the emitter of transistor 66, this transistor is forward biased and hence in a conducting state. With transistor 66 conducting, a positive polarity voltage is applied to the base of transistor 68. As a result, transistor 68 is forward biased and conducting. This in turn results in a positive polarity voltage being applied to the base of transistor switch 34. Transistor switch 34 is thereby forward biased and conducting. As a result, rectifier networks 12 and 20 are both conducting, diode 38 is nonconducting and circuit 10 operates in a full wave rectification mode. In the illustrated embodiment of the present invention, diode 74 is connected to operate as a Baker clamp in order to increase the operating speed and control the base drive current of transistor 68. This circuit design technique is well known in the art.

When $V_{out}$ exceeds the first predetermined voltage value, the signal voltage at divider node 48 exceeds $V_{ref}$. Thus, the voltage at comparator input 56 exceeds that at input 54 and the output of the comparator swings to a high state such that a positive voltage appears on the comparator output. As a result, transistor 66 is no longer forward biased and hence turns off, i.e. becomes nonconducting. With transistor 66 nonconducting, transistors 68 and 34 are no longer forward biased and respectively turn off. With transistor switch 34 turned off, rectifier network 12 and diode 38 are conducting, rectifier network 20 is nonconducting and circuit 10 operates in a half-wave rectification mode.

The operation of control circuit 50 relies on a hysteresis effect such that the first predetermined voltage value of $V_{out}$ at which transistor switch 34 opens, as $V_{out}$ increases, is greater than the second predetermined value of $V_{out}$ at which the switch closes as $V_{out}$ decreases. With comparator output 62 in the low state, resistor 60 is connected to the circuit voltage reference point 37. As a result, resistor 60 is electrically in parallel with resistor 44. Since the parallel combination of resistors 44 and 60 provides a lower effective resistance than resistor 44 alone, a lesser portion of $V_{out}$ applied to divider 40 appears across resistor 44 than would appear if resistor 60 were not in parallel with it. With comparator output 62 in the high state, resistor 60 is no longer in parallel with resistor 44 and a greater portion of $V_{out}$ appears across resistor 44 than would appear if resistor 60 were in parallel with resistor 44. Thus, first and second proportionality relationships exist between the signal voltage at node 48 and $V_{out}$ such that for a particular value of $V_{out}$, the signal voltage will, respectively, be disproportionately high or low with respect to $V_{out}$. This in turn depends on whether the comparator output is respectively in the high or low state. Thus, during full wave rectification, i.e. with transistor switch 34 closed, the comparator output is in the low state and the signal voltage at node 48 is disproportionately low. Because of this, a disproportionately higher value of $V_{out}$ is required in order for the signal voltage to exceed $V_{ref}$.

This higher value of $V_{out}$ is the first predetermined value at which switching from full wave to half-wave rectification takes place during a rising output voltage $V_{out}$ at terminal 32. During half-wave rectification, i.e. with transistor switch 34 open, the comparator output is in the high state and the signal voltage at node 48 is disproportionately high. Because of this, a disproportionately lower value of $V_{out}$ is required in order for the signal voltage to fall below $V_{ref}$. This lower value of $V_{out}$ is the second predetermined value at which switching from half-wave to full wave rectification occurs during a falling output voltage $V_{out}$ at terminal 32. Thus, it is seen that the second predetermined value of $V_{out}$ is less than the first.

In summary, switching from full wave to half-wave rectification takes place during rising output voltage $V_{out}$ by opening transistor switch 34 at the first predetermined value of $V_{out}$. Switching from half-wave to full wave rectification takes place during falling $V_{out}$ by closing transistor switch 34 at the second predetermined value of $V_{out}$.

The embodiment of the invention illustrated in FIG. 1 may be constructed with the following information:

| | |
|---|---|
| Rectifier Networks 12 and 20 | Sensitron SENB664 |
| Diode 38 | 1N5551 |
| Diode 74 | 1N3612 |
| Transistor 34 | 2N6688 |
| Transistor 66 | 2N5416 |
| Transistor 68 | 2N5667 |
| Comparator 52 | LM139 |
| Resistor 35 | 511 Ohms |
| Resistor 42 | 316,000 Ohms |
| Resistor 44 | 5,110 Ohms |
| Resistor 58 | 4,220 Ohms |
| Resistor 60 | 26,100 Ohms |
| Resistor 67 | 2,150 Ohms |
| Resistor 69 | 200 Ohms |
| Resistor 70 | 511 Ohms |
| Resistor 72 | 5 Ohms |
| $V_{ref}$ | +2.5 V |

With the invention so constructed, the first and second predetermined values of $V_{out}$ may calculated as follows:

Initially, during the full wave rectification mode with comparator output 62 in the low state, the magnitude of the voltage $V_{56}$ at comparator input 56 is $$V_{56} = \frac{V_{out} \times \frac{R_{42} \times R_{60}}{R_{42} + R_{60}}}{R_{42} + \frac{R_{42} \times R_{60}}{R_{42} \times R_{60}}}$$

where $R_{42}$=resistance of resistor 42 and
$R_{60}$=resistance of resistor 60
For the resistance values listed above, $V_{56}$=0.01334 $V_{out}$. With an increasing $V_{out}$ and $V_{ref}$=2.5 volts, the comparator output will swing to the high state when $V_{56}$ exceeds 2.5 volts. The value of $V_{out}$ at which this swing occurs is the first predetermined voltage and is $$V_{out} = \frac{2.5}{0.01334} \cong 187 \text{ volts.}$$

In the half-wave rectification mode, comparator output 62 is in the high state and with a decreasing $V_{out}$ the comparator output will swing to the low state when $V_{56}$ falls below $V_{ref}$(2.5 V). The value of $V_{out}$ for which this swing occurs is the second predetermined value of $V_{out}$. This value of $V_{out}$ may be described in terms of a summation of currents at input 56:

$$\frac{2.5}{R_{44}} = \frac{V_{out} - 2.5}{R_{42}} + \frac{V_{cc} - 2.5}{R_{60} + R_{67}},$$

where
$R_{44}$=resistance of resistor 44 and
$R_{67}$=resistance of resistor 67

$V_{cc}$, which varies with $V_{out}$ in the illustrated embodiment, is approximately 10.05 V at the point of interest. Using this value of $V_{cc}$ and the resistance values listed above, the second predetermined value of $V_{out}$=72.6 V.

Figure 5:
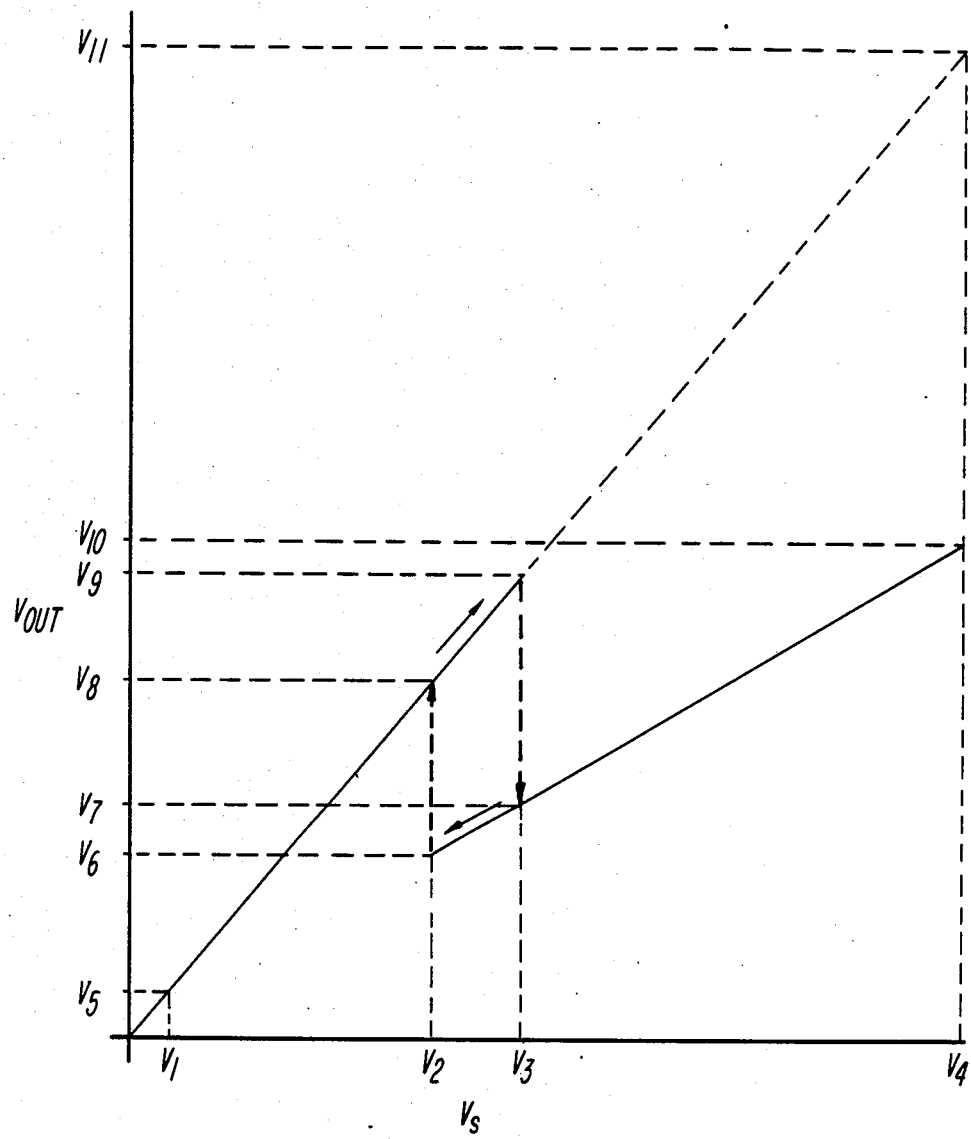
FIG. 5 is a graphical representation of the operation of the rectifier circuit of the present invention.

The operation of circuit 10 can be graphically illustrated as in FIG. 5 where $V_{out}$ is plotted against $V_s$, the source rms phase-to-neutral voltage. The voltage values indicated below are those for the illustrated embodiment and the specific component values listed above. The minimum value of $V_s$ expected during normal operation is $V_1$=8.2 V. The corresponding value of $V_{out}$ due to the full wave rectification mode is $V_5$=2.33×$V_1$=19.1 V. As the source voltage increases, $V_{out}$ increases to the first predetermined value at $V_9$=187 V, as calculated above, which corresponds to a source voltage of $V_3$=$V_9$/2.33=80 V. At this point, circuit 10 switches to the half-wave rectification mode and the value $V_{out}$ in the half-mode wave is $V_7$=$V_3$×1.17=94 V. In the half-wave mode the circuit may operate up to the maximum source voltage $V_4$=171 V which corresponds to a circuit output voltage $V_{10}$=$V_4$×1.17=200 V. If only full wave rectification were available, the circuit output voltage would be $V_{11}$=2.33×$V_4$=398 V. As the source voltage decreases during the half-wave rectification mode, $V_{out}$ falls to the second predetermined voltage $V_6$=72.6 V, as calculated above, at which circuit 10 switches to the full wave rectification mode. The corresponding source voltage at this point is $V_2$=$V_6$/1.17=62 V. As a result of the switch to full wave rectification, $V_{out}$ increases to $V_8$=$V_2$×2.33=144 V. Thus, the source voltage Vs varies over a range from $V_1$=8.2 V to $V_4$=171 V while $V_{out}$ varies from $V_5$=19.1 V to $V_{10}$=200 V. In the absence of the output voltage range limitation provided by circuit 10, $V_{out}$ would range from $V_5$=19.1 V to $V_{11}$=398 V. In the illustrated embodiment, the range of $V_s$ from $V_1$ to $V_4$ or the range of $V_{out}$ from $V_5$ to $V_{11}$ would correspond to a voltage variation of approximately 1 to 20.8 while the range from $V_5$ to $V_{10}$, resulting from the operation of circuit 10, corresponds to a voltage variation of only approximately 1 to 10.5.

While the illustrated embodiment herein is directed to a rectifier circuit adapted for connection to a 3-phase voltage source, the invention is not so limited. It will be readily apparent to those skilled in the art that switching between half-wave and full wave rectification in order to limit the rectified output voltage range is applicable to a single phase source of voltage. Such a source may comprise a center tapped transformer secondary winding wherein the tap point is, for circuit connection purposes, analogous to the neutral point of the 3-phase source. Additionally, each of the two half-wave rectifier networks may comprise two parallel connected diodes rather than three as in the 3-phase circuit illustrated herein. Thus, with the transistor switch closed, the single phase rectifier circuit would be configured as a full wave bridge rectifier.

In the illustrated embodiment herein, voltage scaling means is coupled to the rectifier circuit output in order to develop a proportional signal voltage. It will be appreciated by those skilled in the art that the proportional signal voltage may instead be derived from the AC voltage source by coupling thereto through appropriate scaling means.

While the transistor driver circuit of the present invention is configured as disclosed above, this is not a requirement of the present invention. Numerous transistor driver circuits are well known in the art and may be adapted for use herein.

The preferred embodiment of the present is shown herein as including a bipolar transistor for switch 34. However, the invention is not so limited. Other switching devices such as electromechanical switches or other semiconducting devices may be used. Corresponding changes to the control circuit would be required.

In the embodiment illustrated above, diodes are used in each half-wave rectifier network. The invention need not be so limited. Numerous unidirectionally conducting devices are known in the art and may be substituted for the diodes to achieve equally effective rectifier networks.

While the preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. A rectifier circuit for providing a variable DC output voltage from a varying input AC source to which the rectifier circuit is coupled, wherein the variable DC output range is less than the varying AC input range, said rectifier circuit comprising:
  (a) first multiphase rectifier means for connection to an AC source to provide an output voltage of one polarity at a first output terminal of said rectifier circuit;
  (b) second multiphase rectifier means for connection to an AC source to provide output voltages of an opposite polarity at a second output terminal of said rectifier circuit;
  switching means selectively operable to render one of said rectifier means nonconducting;
  (c) output voltage range compression circuit means for limiting the ratio of the output DC voltage range to a lesser value than the ratio of the AC input voltage range, including;
    (1) control means responsive to the output DC voltage for generating switching voltages in response to the rectified output voltage, said control means generating a first switching voltage when said rectified output voltage is at a predetermined upper level and generating a second switching voltage when said rectified output voltage is at a predetermined lower level,
    (2) means coupling said switching voltages to said switching means for electively actuating said switching means to operate said rectifying means in a half wave rectification mode above said upper level and in a full wave rectification mode below said lower level, and in both half wave and full wave rectification modes between said levels.

(3) said switching means operating to maintain full wave rectification between said levels when said output voltage is increasing and half wave rectification when said output voltage is decreasing.

2. The rectifier circuit of claim 1 wherein said second rectifier means is rendered nonconducting when said switching means is actuated to operate said rectifying means in the half wave mode.

3. The rectifier circuit of claim 2 including a unidirectional conducting means coupled between the variable AC source and the second terminal, wherein said switching means is connected in series between the source and said second terminal.

4. The rectifier of claim 3 wherein said control cirucit further includes:
   switch actuating means coupled to said switching means;
   a comparator having a first input for coupling to a reference voltage source, a second input and an output coupled to said switch actuating means;
   voltage scaling means connected to said first output terminal of said rectifier circuit for supplying a signal voltage to said comparator second input proportional to said DC output voltage; and
   said comparator controlling said switch actuating means to open said switching means when said signal voltage proportional to said first predetermined voltage exceeds said reference voltage and to close said switching means when said signal voltage proportional to said second predetermined voltage is less than said reference voltage.

5. The rectifier circuit of claim 6, which further includes means controlled by said comparator for conditioning said voltage scaling means to establish first and second different proportionality relationships between said signal voltage and said DC output voltage depending upon the condition of said switching means.

6. The rectifier circuit of claim 5 wherein said first and second proportionality relationships occur when said switching means is respectively open and closed; and
   said signal voltage being disproportionately high and low for said first and second proportionality relationships respectively.

7. The rectifier circuit of claim 6 wherein said voltage scaling means comprises a voltage divider, said divider including first and second series connected resistors, one end of said first resistor being coupled to said first output terminal of said rectifier circuit and one end of said second resistor being coupled to a circuit voltage reference point, the series connection of said resistors connected to said comparator second input;
   a third resistor coupled between said output and said second input of said comparator; and
   said comparator operating to switch said third resistor into and out of parallel circuit relation with said second resistor whereby to establish said second and first proportionality relationships respectively.

8. The rectifier circuit of claim 1 wherein said source is an 3-phase source; and
   said first and second rectifier means each being configured as a 3-phase half-wave rectifier.

* * * * *